(12) United States Patent
Ito

(10) Patent No.: US 8,681,391 B2
(45) Date of Patent: Mar. 25, 2014

(54) INFORMATION PROCESSING APPARATUS THAT PERFORMS PROCESS ACCORDING TO PROCESS DEFINITION, CONTROL METHOD THEREFOR, IMAGE PROCESSING APPARATUS, CONTROL METHOD THEREFOR, AND RECORDING MEDIUM STORING CONTROL PROGRAM THEREFOR

(75) Inventor: Mario Ito, Kawasaki (JP)

(73) Assignee: Canon Kabushiki Kaisha (JP)

( * ) Notice: Subject to any disclaimer, the term of this patent is extended or adjusted under 35 U.S.C. 154(b) by 329 days.

(21) Appl. No.: 13/153,961

(22) Filed: Jun. 6, 2011

(65) Prior Publication Data

US 2011/0299141 A1 Dec. 8, 2011

(30) Foreign Application Priority Data

Jun. 7, 2010 (JP) ................. 2010-129932

(51) Int. Cl.
*H04N 1/04* (2006.01)
(52) U.S. Cl.
USPC ............ 358/450; 358/474; 358/452; 358/498

(58) Field of Classification Search
USPC .......................... 358/450, 474, 452, 498, 497
See application file for complete search history.

(56) References Cited

FOREIGN PATENT DOCUMENTS

| JP | 2006-080902 | * | 3/2006 | ............... H04N 1/00 |
| JP | 2006-080902 A | | 3/2006 | |

* cited by examiner

*Primary Examiner* — Houshang Safaipour
(74) *Attorney, Agent, or Firm* — Rossi, Kimms & McDowell LLP (57) ABSTRACT

An information processing apparatus capable of combining images using a ticket in order to lighten user's load concerning operations for setting an image composition process and for selecting a target process definition. The information processing apparatus processes an image read by an image reading unit according to a process definition described by combining one or more information processes. A first addition unit adds a process setting for combining images to the process definition. A combination unit combines the images according to the process definition that is added by the first addition unit.

12 Claims, 8 Drawing Sheets

```xml
<?xml version="1.0" encoding="utf-8"?>
<ScanProcess id="123" Caption="My Process" Comment="Save to my folder on server" used="1">
    <ScanConfiguration id="1">
        <ColorMode>Full Color</ColorMode>
        <Resolution line="X">300</Resolution>
        <Resolution line="Y">300</Resolution>
        <Duplex>Book</Duplex>
    </ScanConfiguration>
    <ImagingProcess>
        <Process id="1" Name="FileConvert" ServerID="AAA" ServerURL="http://aaa.com/imgprocessor/fileconvert/">
            <Param kind="FileFormat">pdf</Param>
        </Process>
        <Process id="2" Name="OCR" ServerID="AAA" ServerURL="http://aaa.com/imgprocessor/ocr/">
            <Param kind="Language">japanese</Param>
        </Process>
        <Process id="3" Name="Destination" ServerID="AAA" ServerURL="http://aaa.com/imgprocessor/dest/">
            <Param>Destination</Param>
        </Process>
        <Process id="4" Name="Combine" ServerID="AAA" ServerURL="http://aaa.com/imgprocessor/combine/">
            <Param kind="FileName">TargetFileName090630.pdf</Param>
        </Process>
    </ImagingProcess>
    <Destination id="1">
        <URI protocol="WebDAV">http://docserver.com/myfolder/</URI>
    </Destination>
    <DocumentProperty>
        <DocumentName>ScannedDocument</DocumentName>
    </DocumentProperty>
</ScanProcess>
```

|   | TICKET LIST |
|---|---|
| 1 | MY PROCESS |
| 2 | MY SCAN TO MOSS |
| 3 | MY SCAN TO FAX |

INFORMATION PROCESSING APPARATUS THAT PERFORMS PROCESS ACCORDING TO PROCESS DEFINITION, CONTROL METHOD THEREFOR, IMAGE PROCESSING APPARATUS, CONTROL METHOD THEREFOR, AND RECORDING MEDIUM STORING CONTROL PROGRAM THEREFOR

BACKGROUND OF THE INVENTION

1. Field of the Invention

The present invention relates to an information processing apparatus that performs a process according to a process definition, a control method therefor, an image processing apparatus, a control method therefor, and a recording medium storing a control program therefor.

2. Description of the Related Art

In recent years, a need for electronization of a paper document is growing. This is because a paper document can be perused, searched, and processed speedily and easily when information read from the paper document is electronized and is stored in storage. Therefore, a method of electronizing a paper document efficiently is required. For example, Japanese Laid-Open Patent Publication (Kokai) No. 2006-80902 (JP 2006-80902A) discloses an image processing system that provides means for connecting documents and can add a document to electronized document data.

On the other hand, there is a known technique that processes data using a process definition file (referred to as a ticket, hereinafter) that defines a content of process regarding a scan of an original, a content of process to image data generated by the scan, etc.

For example, when the ticket defines a scan parameter, a registration destination of image data, etc., an original is read according to the definition in the ticket to generate image data, and the generated image data is registered into a predetermined server according to the definition in the ticket. According to such a system, user's load is lowered and a paper document can be electronized efficiently.

However, the above-mentioned prior art has the following problem in combining documents when electronizing paper documents.

The image processing system like that in JP 2006-80902A, which combines documents, requires manual operations, such as designation of a server that stores files, designation of files to be combined, setting of scan parameters, which complicates the operations and increases user's load.

In order to lighten such user's load, it is possible to combine documents by a system that uses the ticket mentioned above. For example, a case to register image data into a predetermined server by the above-mentioned method, to generate new image data by reading another original, and then to combine the new image data with the registered image data to register the combined image data into the server is assumed.

In this case, after registering the image data obtained from the first original into the server, the ticket used for the beginning is selected from among a plurality of tickets, another original is read according to the definition of the ticket concerned, and the image data is registered into the server. After that, the user must instruct to combine the image data registered at the beginning with the read image data registered as another file by complicated manual operations. This complicates the user's operations. Particularly, when the number of tickets becomes large, it takes much effort to find and select a target ticket, which causes a problem of increasing user's load.

SUMMARY OF THE INVENTION

The present invention provides an information processing apparatus, a control method therefor, an image processing apparatus, a control method therefor, and a recording medium storing a control program therefor, which are capable of combining images using a ticket in order to lighten user's load concerning operations for setting an image composition process and for selecting a target process definition.

Accordingly, a first aspect of the present invention provides an information processing apparatus that processes an image read by an image reading unit according to a process definition described by combining one or more information processes, comprising a first addition unit configured to add a process setting for combining images to the process definition, and a combination unit configured to combine the images according to the process definition that is added by the first addition unit.

Accordingly, a second aspect of the present invention provides An image processing apparatus comprising an image reading unit configured to read an image, a selection unit configured to select a predetermined process definition from a list of process definitions each of which is described by combining one or more information processes, an execution unit configured to execute a process according to the process definition selected by the selection unit, a sending unit configured to send the image acquired by the image reading unit and the process definition to an information processing apparatus, a first division unit configured to divide the process definitions of the process definition list into a group including the process setting for combining images and a group not including the process setting for combining images, and a presentation unit configured to present the process definitions used as the selection targets in the selection unit according to the result of the process by the first division unit.

Accordingly, a third aspect of the present invention provides a control method for an information processing apparatus that processes an image read by an image reading unit according to a process definition described by combining one or more information processes, the control method comprising an addition step of adding a process setting for combining images to the process definition, and a combination step of combining the images according to the process definition that is added in the addition step.

Accordingly, a fourth aspect of the present invention provides a control method for an image processing apparatus including an image reading unit of reading an image, a selection unit of selecting a predetermined process definition from a list of process definitions each of which is described by combining one or more information processes, an execution unit of executing a process according to the process definition selected by the selection unit, and a sending unit of sending the image read by the image reading unit and the process definition to an information processing apparatus, the control method comprising a first division step of dividing the process definitions of the process definition list into a group including the process setting for combining images and a group not including the process setting for combining images, and a presentation step of showing the process definitions used as the selection targets in the selection unit according to the result of the process in the first division step.

Accordingly, a fifth aspect of the present invention provides a non-transitory computer-readable storage medium storing a control program causing a computer to execute a control method for an information processing apparatus, the control method comprising an execution step of processing an image read by an image reading unit according to a process definition described by combining one or more information processes, an addition step of adding a process setting for combining images to the process definition, and a combination step of combining the images according to the process definition to which the process setting is added in the addition step.

Accordingly, a sixth aspect of the present invention provides a non-transitory computer-readable storage medium storing a control program causing a computer to execute a control method for an information processing apparatus including an image reading unit of reading an image, a selection unit of selecting a predetermined process definition from a list of process definitions each of which is described by combining one or more information processes, an execution unit of executing a process according to the process definition selected by the selection unit, and a sending unit of sending the image read by the image reading unit and the process definition to an information processing apparatus, the control method comprising a first division step of dividing the process definitions of the process definition list into a group including the process setting for combining images and a group not including the process setting for combining images, and a presentation step of showing the process definitions used as the selection targets in the selection unit according to the result of the process in the first division step.

According to the present invention, images can be combined using the process definition and the user's complicated operations for setting the image composition process, etc. can be reduced.

The user's load is lightened about the operation for selecting the target process definition.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings.

Figure 1:
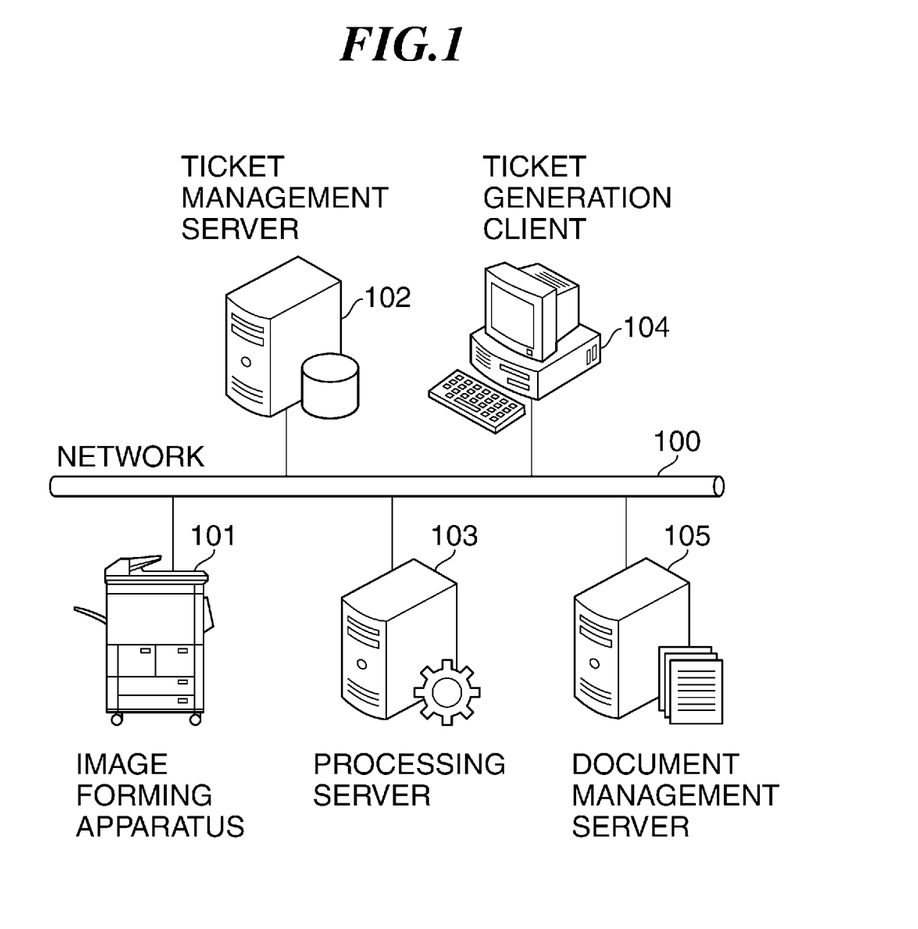
FIG. 1 is a view showing a hardware configuration example of an image processing system according to a first embodiment of the present invention.

FIG. 1 is a view showing a hardware configuration example of an image processing system according to a first embodiment of the present invention.

The system comprises an image forming apparatus 101, a ticket management server (a second storage device) 102, a processing server (information processing apparatus) 103, a ticket generation client 104, and a document management server (a first storage device) 105, which are connected via a network 100. The network 100 is a resource for communication among the apparatuses, and is a network system like an intranet or the Internet.

The image forming apparatus 101 has functions of reading a document and for electronizing it to generate image data. An MFP (Multiple Function Peripheral) is used as the image forming apparatus 101, for example. The ticket management server 102 has functions of storing and acquiring data. A directory service like an active directory may be used instead.

A process definition file 500, which is described by combining one or more processes (contents of processes) executed by the image forming apparatus 101 or the processing server 103, is called a "ticket" in this embodiment. The ticket is generated by the ticket generation client 104, and is stored in the ticket management server 102. The contents of processes described in the ticket include settings of a resolution, a size, etc. at the time of reading image data, and subsequent processes (an E-mail transmission, a file transmission, an OCR process, etc.), for example.

The processing server 103 has data processing functions (the E-mail transmission, the file transmission, the OCR process, etc.) of processing data such as an image and a file. The ticket generation client 104 is a personal computer that generates a ticket by receiving instructions from a user, and registers the ticket to the ticket management server 102 via the network 100.

The document management server 105 is able to register and manage data such as an image and a file as document data, and has a function of searching of the registered document data. When receiving a request from the processing server 103 via the network 100, the document management server 105 executes processes of registration, search, and management of the document data according to the request. The processing server 103 may double as the document management server 105. The document management server 105 may be a MOSS (Microsoft Office SharePoint Server) as long as it can execute the process of registration, search, and management of the document data.

It should be noted that each of the image forming apparatus 101, the processing server 103, the ticket generation client 104, and the document management server 105 may be plural.

Figure 2A:
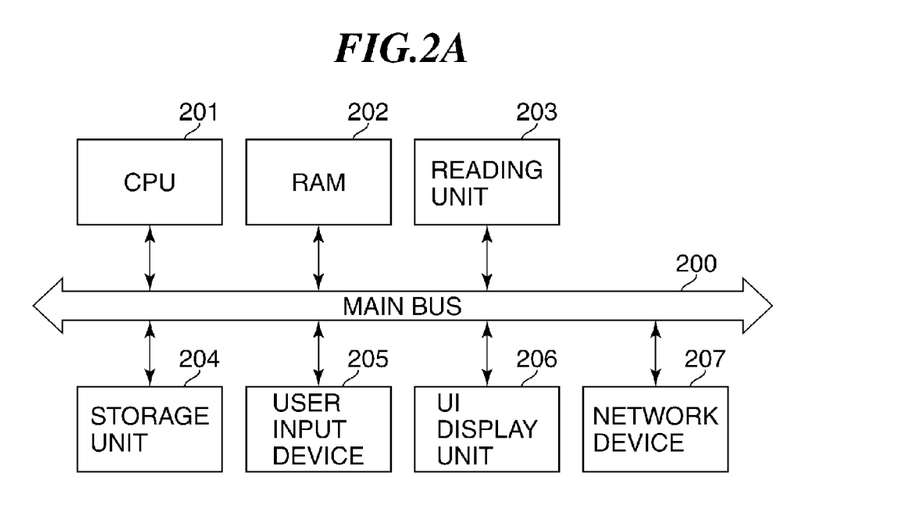
FIG. 2A is a block diagram schematically showing a hardware configuration example of the image forming apparatus shown in FIG. 1.

FIG. 2A is a block diagram schematically showing a hardware configuration example of the image forming apparatus 101 shown in FIG. 1.

As shown in FIG. 2A, the image forming apparatus 101 is provided with a CPU 201, a RAM 202, a reading unit 203, a storage unit 204, a user input device 205, a UI display unit 206, and a network device 207, which are mutually connected via a main bus 200.

The CPU 201 is a central processing unit that executes a program concerning the embodiment. The RAM 202 is a memory that provides a work area of the CPU 201. The reading unit 203 reads an image on an original and converts it into electronic data. The storage unit 204 stores the program and various kinds of set information.

The user input device 205 is used for a user to input a command, and the UI display unit 206 displays a screen. The network device 207 communicates with the other apparatuses via the network.

In the image forming apparatus 101, the CPU 201 controls operations of the RAM 202, the reading unit 203, the storage unit 204, the user input device 205, the UI display unit 206, and the network device 207 via the main bus 200. The UI display unit 206 may double as the user input device 205.

Figure 2B:
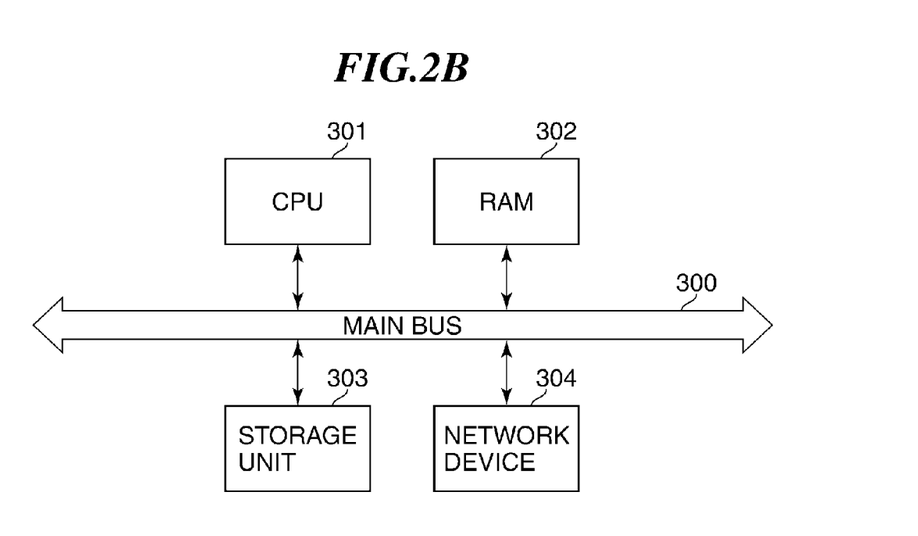
FIG. 2B is a block diagram schematically showing a hardware configuration example of the processing server shown in FIG. 1.

FIG. 2B is a block diagram schematically showing a hardware configuration example of the processing server 103 shown in FIG. 1.

As shown in FIG. 2B, the processing server 103 is provided with a CPU 301, a RAM 302, a storage unit 303, and a network device 304, which are mutually connected via a main bus 300.

The CPU 301 is a central processing unit that executes a program concerning the embodiment. The RAM 302 is a memory that provides a work area of the CPU 301. The storage unit 303 stores the program and various kinds of set information. The network device 304 communicates with the other apparatuses via the network.

In the processing server 103, the CPU 301 controls the RAM 302, the storage unit 303, and the network device 304 via the main bus 300. It should be noted that the ticket management server 102 and the document management server 105 are constituted as well as the processing server 103.

The ticket generation client 104, which consists of a personal computer, is provided with a CPU, a RAM, a storage unit, and a network device, and also is provided with a user input device and a UI display unit (not shown) that have the similar function as what was mentioned above.

Figure 3:
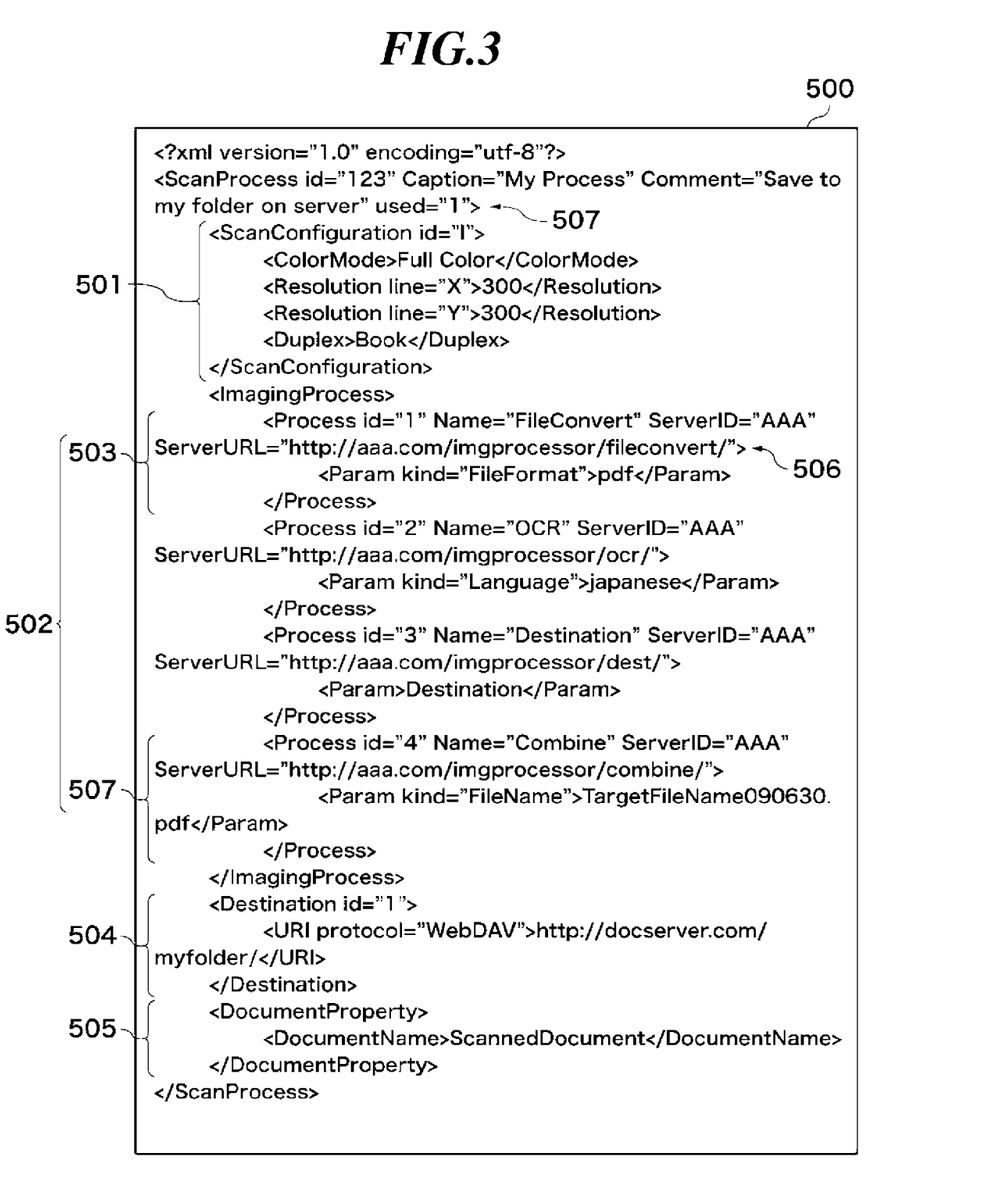
FIG. 3 is a view showing an example of contents of a ticket generated by the ticket generation client shown in FIG. 1.

FIG. 3 is a view showing an example of contents of a ticket generated by the ticket generation client 104.

Although a ticket file 500 shown in FIG. 3 is described in the XML, a file format is not limited to the XML as long as the file can express structured data.

The ticket 500 is generated by the ticket generation client 104, and is stored and managed in the ticket management server 102. The ticket management server 102 manages a plurality of tickets similar to this.

The scan setting 501 shown in FIG. 3 describes set information about reading of an original that is used when the scanning ticket is executed by the image forming apparatus 101. The set information includes settings, such as a color mode, a resolution, and a double-sided setting, which are required for reading. The contents of the set information are not limited to what are shown in the embodiment.

The flow setting 502 describes a process setting 503 and order of processes that the processing server 103 processes the image data read by the image forming apparatus 101. The process setting may be plural. The process setting 503 describes the order of process, a processing name, server URL to process, and set information required for a process are describing. A combination process setting 507 will be added to the flow setting 502 by a process in step S904 in FIG. 6 mentioned later. The combination process setting 507 describes information for specifying a scanned image file used as a combination target. Although the file name is described in the example shown in FIG. 3, other data may be used as long as it specifies the scanned image file used as the combination target.

A save destination 504 describes the address of the document management server 105 that saves the image data (the image file) processed by the process setting 503, a folder path, and a communication protocol. A document attribute 505 describes attribution information that the image data to be saved involves. For example, they are a document name, an update date, an author, etc.

Figure 4:
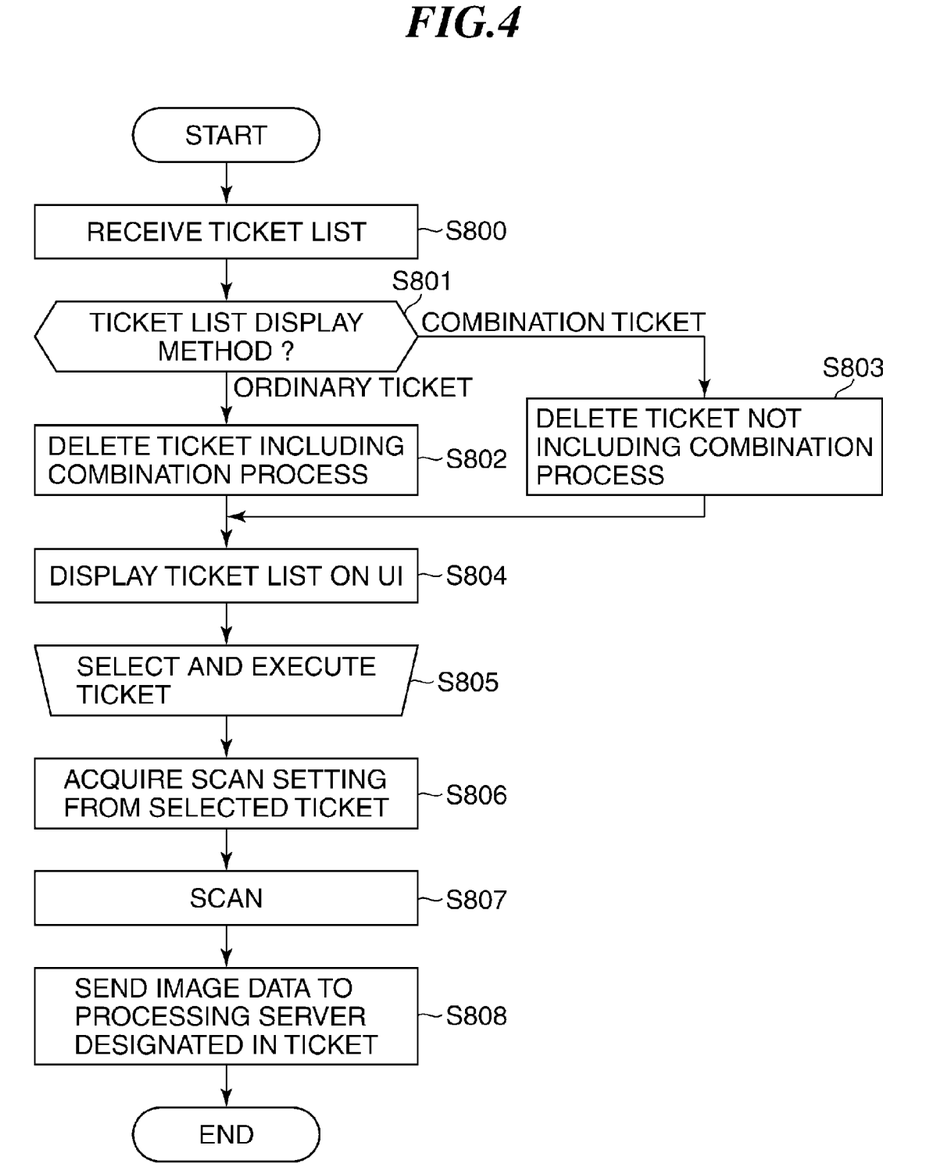
FIG. 4 is a flowchart showing a process executed by the image forming apparatus shown in FIG. 1.

FIG. 4 is a flowchart showing a process executed by the image forming apparatus 101 shown in FIG. 1. The process is achieved when the CPU 201 of the image forming apparatus 101 executes the program stored in the storage unit 204.

Figure 5A:
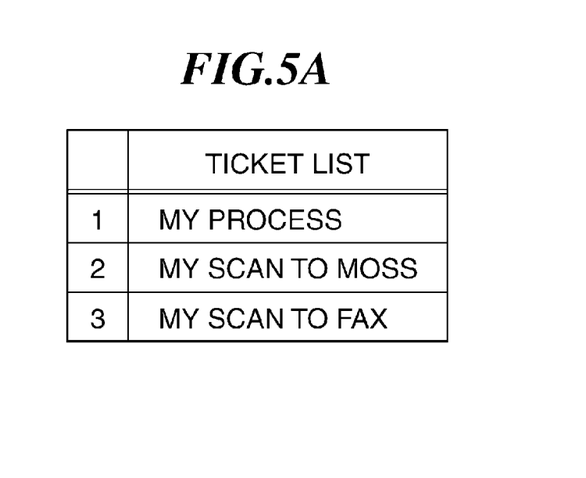
FIG. 5A is a view showing a ticket list used by the image processing system in FIG. 1.

In step S800, the image forming apparatus 101 receives a ticket list as shown in FIG. 5A, for example, from the ticket management server 102 first. At the time, the image forming apparatus 101 may send authentication information that specifies a user, and may receive a ticket list associated with the user.

Figure 5B:
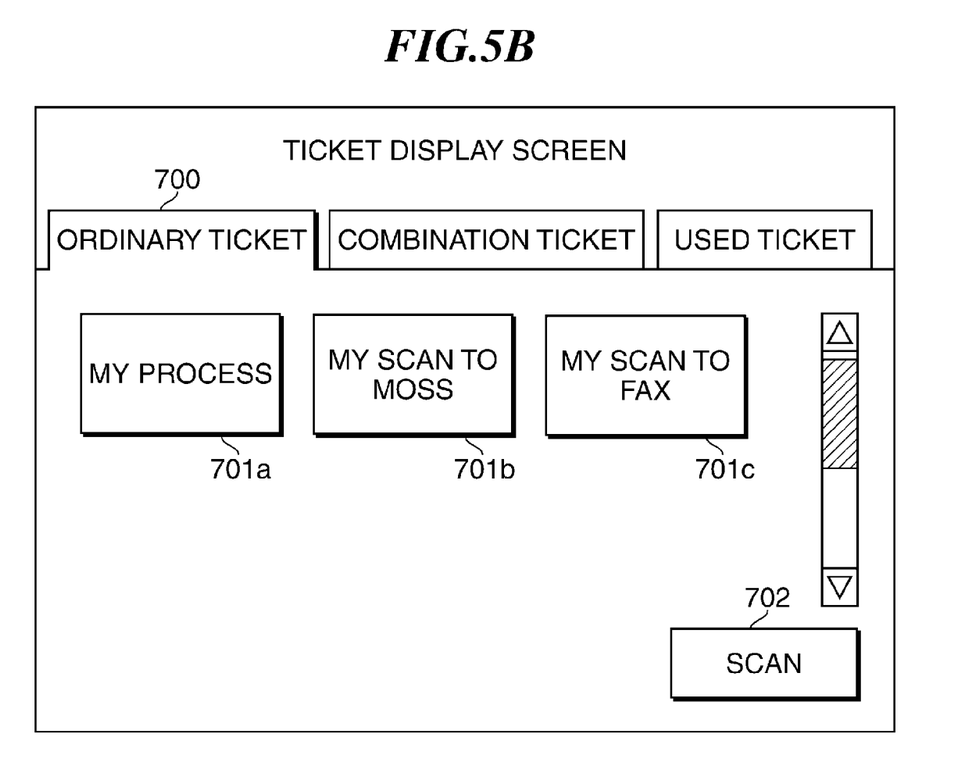
FIG. 5B is a view showing an example of a ticket display screen used by the image processing system in FIG. 1.

In the next step S801, the image forming apparatus 101 determines a ticket list display method according to the information (an ordinary ticket, a combination ticket, etc., shown by tags 700 in FIG. 5B) received by the user input device 205. When displaying only a ticket (an ordinary ticket) not including a combination process, the process proceeds to step S802. When displaying only a ticket (a combination ticket) including a combination process, the process proceeds to step S803.

In the step S802, the image forming apparatus 101 creates an execution ticket list by removing a ticket including a combination process from the ticket list. In the step S803, the image forming apparatus 101 creates an execution ticket list by removing a ticket not including a combination process from the ticket list.

In the next step S804, the image forming apparatus 101 displays a ticket as a selection target included in the execution ticket list on the UI display unit 206 so that the user can select. Buttons 701a, 701b, and 701c shown in FIG. 5B present the tickets as the selection targets selectably.

In the next step S805, the user input device 205 receives a user's selection of the ticket in the execution ticket list, and receives a depression of a scan button 702 shown in FIG. 5B.

In the next step S806, the image forming apparatus 101 acquires the scan setting 501 (FIG. 3) from the ticket selected in the step S805. In the following step 807, the image forming apparatus 101 reads (scans) an original using the scan setting acquired in the step S806.

In step S808, the image forming apparatus 101 acquires a destination 506 that specifies a processing server from the first process setting (the process setting 503) described in the ticket selected in the step S805. Further, the image forming apparatus 101 sends the ticket selected in the step S805 and the image data read in the step S807 to the destination 506.

Figure 6:
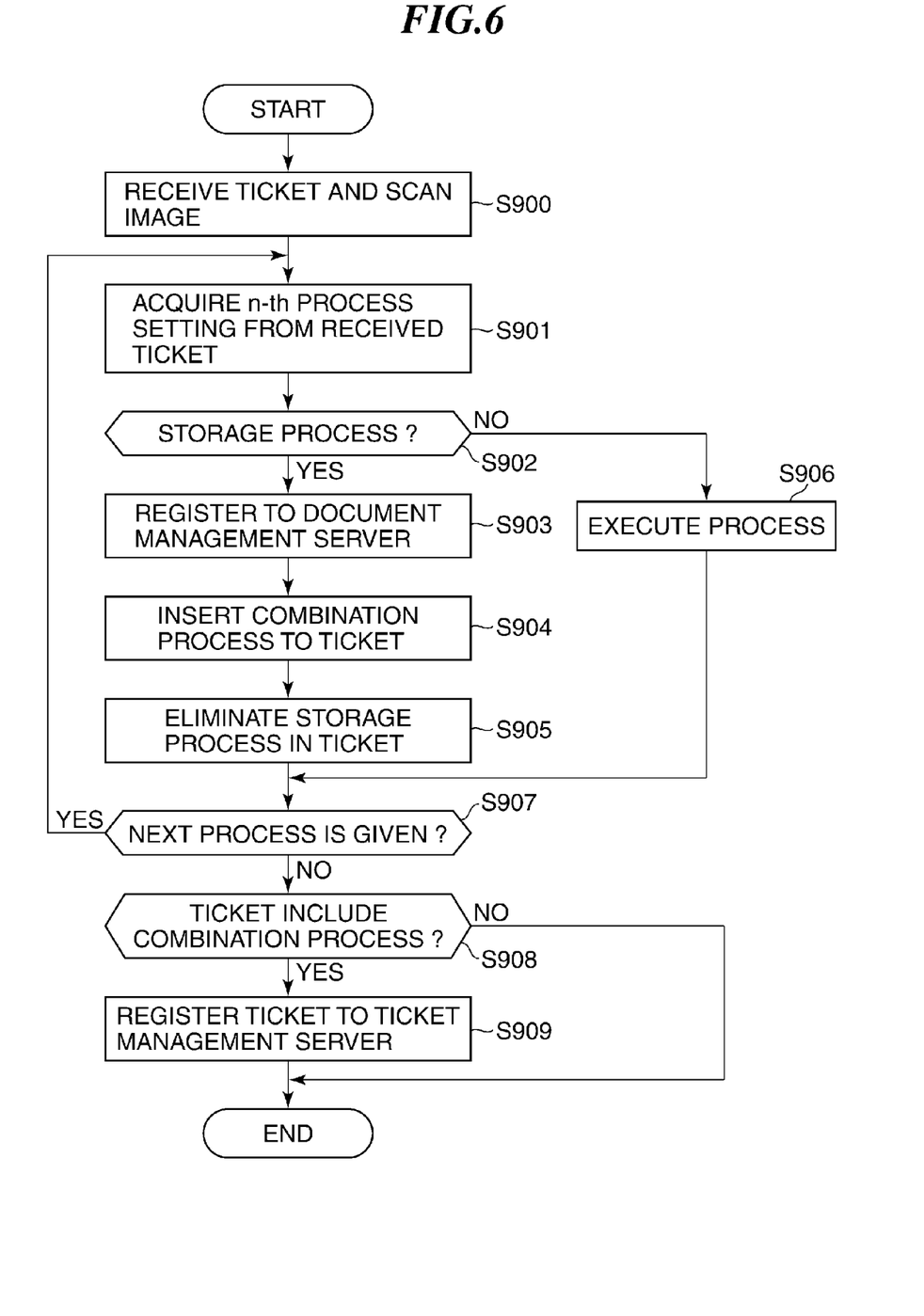
FIG. 6 is a flowchart showing a ticket execution process executed by the processing server shown in FIG. 1.

FIG. 6 is a flowchart showing a ticket execution process executed by the processing server 103 shown in FIG. 1. The process is achieved when the CPU 301 of the processing server 103 executes the program stored in the storage unit 303.

In step S900, the processing server 103 receives the ticket and the scan image from the image forming apparatus 101 first. In this example, the ticket and the read scan image file in a file format, such as JPEG, TIFF, or PDF, which can be developed by the processing server are received from the image forming apparatus 101.

In the next step S901, the processing server 103 acquires the n-th process setting 503 (an initial value of n equals 1, and each execution increments n by 1) from the received ticket. In the following step S902, the processing server 103 determines whether the process setting acquired in the step S901 is a storage process (a process to register an image file into the document management server 105 or the processing server 103). If it is the storage process, the process proceeds to step S903. If it is not the storage process, the process proceeds to step S906.

In the step S903, the processing server 103 executes the storage process according to the process setting read in the step S901. Although the embodiment employs the WebDav, another storage method like the FTP can be employed. In the following step S904, the processing server 103 inserts the combination process setting 507 (FIG. 3) in the ticket received in the step S900 as the n-th process. As mentioned above, the combination process setting 507 describes information for specifying a scanned image file used as a combination target.

In the next step S905, the processing server 103 eliminates the storage process defined as the (n+1)th process in the ticket inserted in the step S904, and increments the order of the processes by 1 when the (n+2)th process is defined.

On the other hand, in the step S906, the processing server 103 executes processes (the E-mail transmission, the File transmission, the OCR process, etc.) according to the process setting acquired in the step S901. The processing server 103 is able to execute the processes including an image combination process. When executing the combination process, the processing server 103 acquires the image files designated by the combination process setting 507 from the document management server 105, and combines the image files. That is, the processing server 103 combines the scanned image files received from the image forming apparatus 101 in the step S900, and updates the image file designated by the combination process setting 507. The processing server 103 does not only add the received scanned image file to the end of the image file designated by the combination process setting 507, but also it may insert the scanned image file into the image file. When the file designated by the combination process setting 507 is not given in the document management server 105, the processing server 103 registers newly without executing the combination process. Even when the combination process is executed, the processing server 103 may register the combined image file newly.

The process proceeds to step S907 after the process in the step S905 or the step S906. In the step S907, the processing server 103 determines whether the (n+1)th process is given in the process setting read in the step S901. When it is given, the process proceeds to the step S901. When it is not given, the process proceeds to step S908.

In the step 908, the processing server 103 determines whether the ticket received in the step S900 or the ticket processed in the steps S904 and S905 includes the combination process setting 507. When the combination process setting 507 is included, the process proceeds to step S909. When the combination process setting 507 is not included, the process skips the step S909 and finishes.

In the step 909, the processing server 103 registers the ticket received in the step S900 or the ticket processed in the steps S904 and S905 into the ticket management server 102. It should be noted that the registration process may be executed by the image forming apparatus 101 in place of the processing server 103. In this case, the image forming apparatus 101 determines whether the ticket includes the storage process in the step S808 in FIG. 4, after sending the ticket and the image.

When the ticket includes the storage process, the image forming apparatus 101 adds the combination process setting to the ticket, and deletes the storage process. Then, the image forming apparatus 101 registers the updated ticket to the ticket management server 102.

The first embodiment has the following advantages.
(1) Since the image processing system using a ticket can combine documents, the user can perform the combination process of documents without complicated works, such as the setting operation. That is, when performing the combination process of documents, the user selects a "combination ticket" tag among the tags 700 in the ticket display screen as shown in FIG. 5B, and selects the ticket of the combination target among the displayed tickets. Then, the combination process of the documents read from the reading unit 203 can be executed by an easy operation by only pushing the scan button 702.
(2) When the ticket list display method is determined and only the tickets (the ordinary tickets) that do not include the combination process are displayed, the execution ticket list, which is generated by removing the tickets including the combination process from the ticket list, is displayed on the UI display unit 206. When only the tickets (the combination tickets) that include the connection process are displayed, the execution ticket list, which is generated by removing the tickets not including the combination process from the ticket list, is displayed. Accordingly, the execution ticket list that is selectably displayed on the UI display unit 206 shows only the necessary tickets and does not show unnecessary tickets. As a result, even if the number of tickets increases, the user can find and select a desired ticket easily, which reduces the user's load.

A second embodiment of the present invention will be described. The second embodiment differs from the first embodiment at the point that enables to select a ticket (a ticket with an execution result) that a user executed in the past in the image forming apparatus 101. Since the hardware configuration of the second embodiment is identical to that of the first embodiment, the description thereof is omitted. In the second embodiment, execution result information about a ticket is described in a section of the combination process setting 507 in the ticket file 500 shown in FIG. 3.

Figure 7:
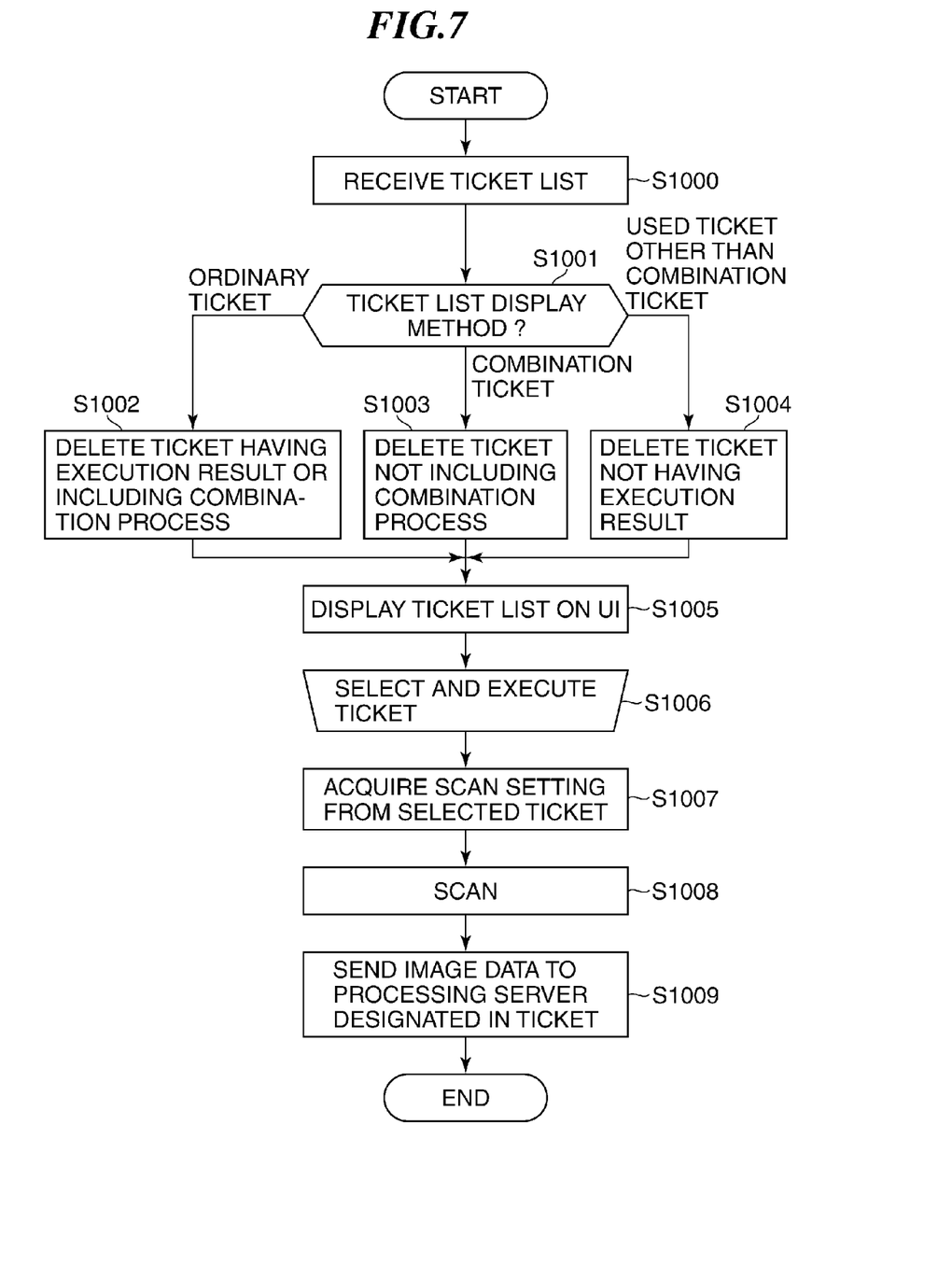
FIG. 7 is a flowchart showing a process executed by an image forming apparatus according to a second embodiment.

FIG. 7 is a flowchart showing a ticket display-and-execution process by the image forming apparatus 101 according to the second embodiment. The process is achieved when the CPU 201 of the image forming apparatus 101 executes the program stored in the storage unit 204.

Processes in steps S1000, S1001, and S1003 shown in FIG. 7 are identical to the processes in the steps S800, S801, and S803 in FIG. 4, respectively. Since processes in steps S1005 through S1009 are identical to the processes in the steps S804 through S808, respectively, duplicated descriptions are omitted.

In the step S1001 in FIG. 7, the image forming apparatus 101 determines a ticket list display method according to the information (an ordinary ticket, a combination ticket, etc., shown by the tags 700 in FIG. 5B) received by the user input device 205. When displaying only a ticket without an execution result, the process proceeds to step S1002. When displaying only a ticket including a combination process, the process proceeds to the step S1003. When displaying a ticket with an execution result other than a combination process, the process proceeds to step S1004.

In the step S1002, the image forming apparatus 101 creates an execution ticket list by removing a ticket including the execution result information and a ticket including the combination process from the ticket list. In the step S1003, the image forming apparatus 101 creates an execution ticket list by removing a ticket not including a combination process from the ticket list. In the step S1004, the image forming apparatus 101 creates an execution ticket list by removing a ticket not including the execution result information from the ticket list.

Figure 8:
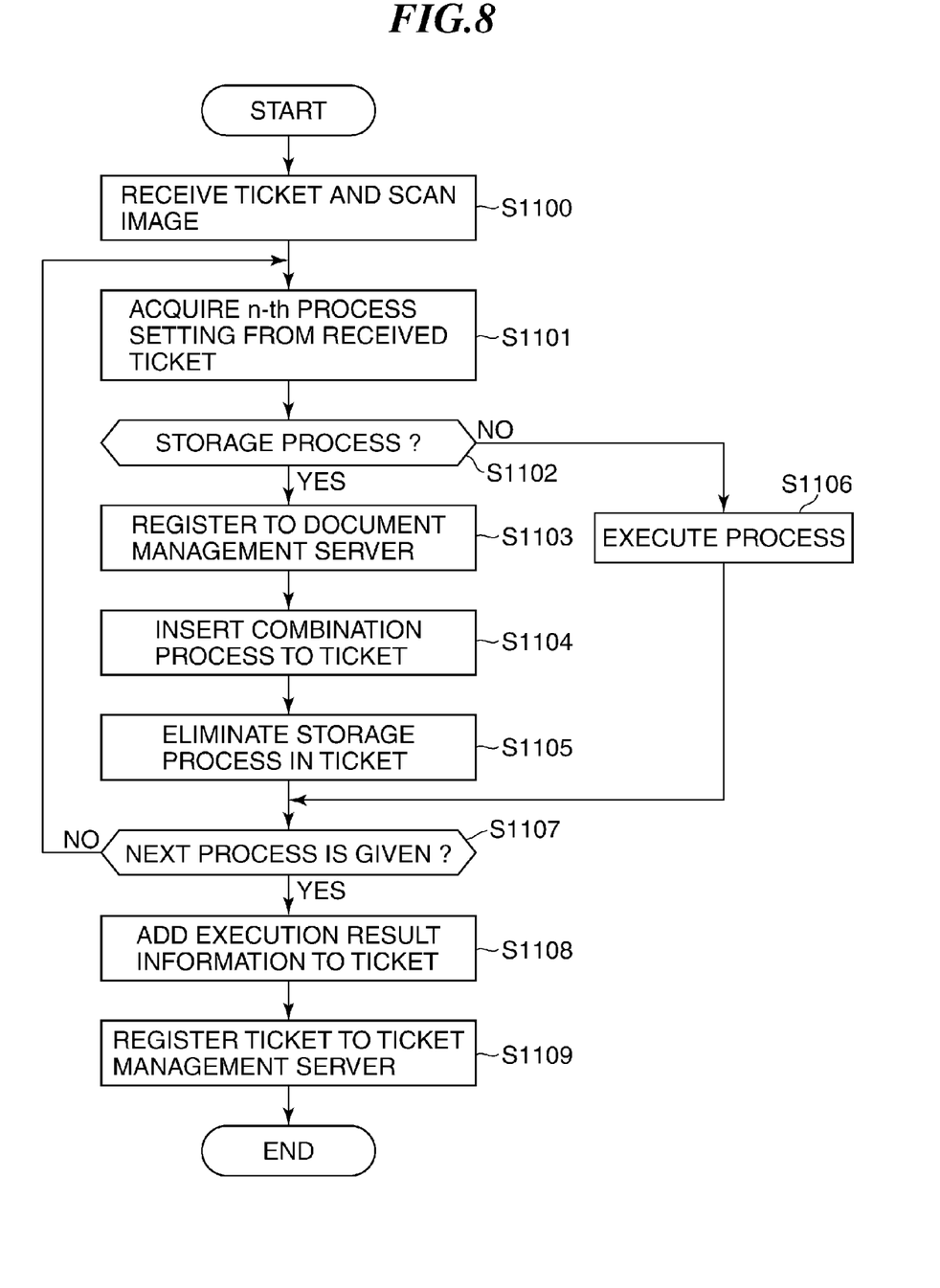
FIG. 8 is a flowchart showing a process executed by a processing server according to the second embodiment.

FIG. 8 is a flowchart showing a ticket execution process executed by the processing server 103 according to the second embodiment. The process is achieved when the CPU 301 of the processing server 103 executes the program stored in the storage unit 303.

Processes in steps S1100 through S1105 shown in FIG. 8 are identical to the processes in the steps S900 through S905 in FIG. 6, respectively.

A process in step S1106 in FIG. 8 is identical to that in the step S906 in FIG. 6. In the combination process, when there is no image as a combination target, a ticket may be saved without combining.

In step S1107 after the process of the step S1105 or the step S1106, the processing server 103 determines whether the (n+1)th process setting is given in the ticket read in the step S1100. When it is given, the process returns to the step S1101. When it is not given, the process proceeds to step S1108.

In the step S1108, the processing server 103 adds the execution result information to the ticket (the process definition after execution) received in the step S1100. In the following step S1109, the processing server 103 registers a total of two tickets, which include the ticket added in the step S1108 and the ticket updated in the steps S1104 and S1105, into the ticket management server 102.

The second embodiment has the following advantages. According to the second embodiment, a ticket used once can be continuously used in the document registration process using a ticket. That is, since only the tickets with the execution result are presented to a user from among many ticket, the number of the tickets on the selection screen is reduced, which reduces the user's load of the ticket selection.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-129932, filed on Jun. 7, 2010, which is hereby incorporated by reference herein in its entirety.

What is claimed is:

1. An information processing apparatus that processes an image read by an image reading unit according to a process definition described by combining one or more information processes, comprising:
a first addition unit configured to add a process setting for combining images to the process definition;
a combination unit configured to combine the images according to the process definition that is added by said first addition unit; and
a first storage device configured to store the image acquired by the image reading unit,
wherein said first addition unit does not add the process setting when the process definition does not include a process to store the image into said first storage device.

2. The information processing apparatus according to claim 1,
wherein said first addition unit adds the process setting when the process definition includes a process to store the image into said first storage device.

3. An information processing apparatus that processes an image read by an image reading unit according to a process definition described by combining one or more information processes, comprising:
a first addition unit configured to add a process setting for combining images to the process definition;
a combination unit configured to combine the images according to the process definition that is added by said first addition unit; and
a determination unit configured to determine whether the process definition includes the process setting for combining the images; and a storage unit configured to store the process definition,
wherein the process setting is stored into said storage unit when said determination unit determines that the process definition includes the process setting for combining the images, and the process setting is not stored into said storage unit when said determination unit determines that the process definition does not include the process setting for combining the images.

4. The information processing apparatus according to claim 3, further comprising:
a second addition unit configured to add information showing an execution result to the process definition after storing to said second storage unit.

5. An image processing apparatus comprising:
an image reading unit configured to read an image;
a selection unit configured to select a predetermined process definition from a list of process definitions each of which is described by combining one or more information processes;
an execution unit configured to execute a process according to the process definition selected by said selection unit;
a sending unit configured to send the image acquired by said image reading unit and the process definition to an information processing apparatus;
a first division unit configured to divide the process definitions of the process definition list into a group including the process setting for combining images and a group not including the process setting for combining images; and
a presentation unit configured to present the process definitions used as the selection targets in said selection unit according to the result of the process by said first division unit.

6. The information processing apparatus according to claim 5, further comprising:
a second division unit configured to divide the process definitions of the process definition list into a group having an execution result and a group not having an execution result,
wherein said presentation unit presents the process definitions used as the selection targets in said selection unit according to the result of the process by said second division unit.

7. A control method for an information processing apparatus that processes an image read by an image reading unit according to a process definition described by combining one or more information processes, the control method comprising:
an addition step of adding a process setting for combining images to the process definition;
a combination step of combining the images according to the process definition that is added in said addition step; and a storage step of storing, into a first storage device, the image acquired by the image reading unit, wherein said addition step does not add the process setting when the process definition does not include a process to store the image into said first storage device.

8. A control method for an image processing apparatus including an image reading unit of reading an image, a selection unit of selecting a predetermined process definition from a list of process definitions each of which is described by combining one or more information processes, an execution unit of executing a process according to the process definition selected by the selection unit, and a sending unit of sending the image read by the image reading unit and the process definition to an information processing apparatus, the control method comprising:

a first division step of dividing the process definitions of the process definition list into a group including the process setting for combining images and a group not including the process setting for combining images; and a presentation step of showing the process definitions used as the selection targets in the selection unit according to the result of the process in said first division step.

9. A non-transitory computer-readable storage medium storing a control program causing a computer to execute a control method for an information processing apparatus, the control method comprising:

an execution step of processing an image read by an image reading unit according to a process definition described by combining one or more information processes;

an addition step of adding a process setting for combining images to the process definition;

a combination step of combining the images according to the process definition to which the process setting is added in said addition step; and a storage step of storing, into a first storage device, the image acquired by the image reading unit, wherein said addition step does not add the process setting when the process definition does not include a process to store the image into said first storage device.

10. A non-transitory computer-readable storage medium storing a control program causing a computer to execute a control method for an information processing apparatus including an image reading unit of reading an image, a selection unit of selecting a predetermined process definition from a list of process definitions each of which is described by combining one or more information processes, an execution unit of executing a process according to the process definition selected by the selection unit, and a sending unit of sending the image read by the image reading unit and the process definition to an information processing apparatus, the control method comprising:

a first division step of dividing the process definitions of the process definition list into a group including the process setting for combining images and a group not including the process setting for combining images; and a presentation step of showing the process definitions used as the selection targets in the selection unit according to the result of the process in said first division step.

11. A control method for an information processing apparatus that processes an image read by an image reading unit according to a process definition described by combining one or more information processes, the control method comprising:

a first addition step of adding a process setting for combining images to the process definition;

a combination step of combining the images according to the process definition that is added by said first addition step; and a determination step of determining whether the process definition includes the process setting for combining the images; and a storage step of storing the process definition, wherein the process setting is stored by said storage step when said determination step determines that the process definition includes the process setting for combining the images, and the process setting is not stored by said storage step when said determination step determines that the process definition does not include the process setting for combining the images.

12. A non-transitory computer-readable storage medium storing a control program causing a computer to execute a control method for an information processing apparatus that processes an image read by an image reading unit according to a process definition described by combining one or more information processes, the control method comprising:

a first addition step of adding a process setting for combining images to the process definition;

a combination step of combining the images according to the process definition that is added by said first addition step; and a determination step of determining whether the process definition includes the process setting for combining the images; and a storage step of storing the process definition, wherein the process setting is stored by said storage step when said determination step determines that the process definition includes the process setting for combining the images, and the process setting is not stored by said storage step when said determination step determines that the process definition does not include the process setting for combining the images.

* * * * *